(12) United States Patent
Pohlmann et al.

(10) Patent No.: US 6,709,750 B1
(45) Date of Patent: Mar. 23, 2004

(54) HOT-MELT ADHESIVE FOR SEALING THE EDGE OF LAMINATED GLASS

(75) Inventors: Thomas Pohlmann, Niedernberg (DE); Michael Schwamb, Frankfurt am Main (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/701,793

(22) PCT Filed: May 20, 1999

(86) PCT No.: PCT/EP99/03457

§ 371 (c)(1), (2), (4) Date: Feb. 22, 2001

(87) PCT Pub. No.: WO99/62685

PCT Pub. Date: Dec. 9, 1999

(30) Foreign Application Priority Data

Apr. 6, 1998 (DE) .......................... 198 24 965

(51) Int. Cl.⁷ .............................................. B32B 17/10
(52) U.S. Cl. ...................... 428/441; 428/442; 528/319
(58) Field of Search .................... 526/319; 428/441, 428/442

(56) References Cited

U.S. PATENT DOCUMENTS

| 4,045,517 A | | 8/1977 | Guerin et al. | |
| 5,120,789 A | * | 6/1992 | Schmelzer et al. | ......... 525/142 |

FOREIGN PATENT DOCUMENTS

| DE | 4304014 | | 8/1994 |
| GB | 1431070 | * | 4/1976 |

OTHER PUBLICATIONS

G. Habenicht, Kleben Grundlagen, Technologie, Anwendungen, Springer–Verlag Berlin Heidelberg New York Yokyo 1986, Seite 100–102.

* cited by examiner

*Primary Examiner*—Bernard Lipman
(74) *Attorney, Agent, or Firm*—Antonelli, Terry, Stout & Kraus, LLP

(57) ABSTRACT

The invention relates to a hot-melt adhesive for sealing the edge of laminated glass that has been produced according to cast-resin technology. The inventive adhesive comprises acrylate or metacrylate homopolymers or copolymers or mixtures thereof. The invention also relates to a method for the production and to the uses of said hot-melt adhesive.

12 Claims, No Drawings

HOT-MELT ADHESIVE FOR SEALING THE EDGE OF LAMINATED GLASS

BACKGROUND OF THE INVENTION

The present invention relates to a new hot-melt adhesive for sealing the edge of laminated glass that is produced by means of casting-resin technology, a method for the preparation thereof, and also uses of this hot-melt adhesive.

Laminated glass consists of at least two glass panes and one intermediate layer which connects the glass panes with one another. The glass panes can be selected from inorganic glass, such as float glass, colourless glass, single-pane safety glass, partly tempered glass, coloured glass, coated glass, mirror-coated glass and thin-film solar modules, and from organic glass, such, as, for example, glass made from polymethacrylate or polycarbonate, with it also being possible to combine with one another glass panes that are made of different types of glass.

Laminated glass is used, for example, as laminated glass with safety and/or sound-proofing properties, as fire-protection glass, as laminated glass with temperature-dependent variation of its light-transmitting capacity, when sealing objects in the interspace between the panes of the glass composite (for example solar cells or lamellar systems, which are used to protect against insolation or for looking through, are sealed in the interspace between the panes), or for the protection of surfaces by bonding to the surface with one glass pane (planar surfaces (for example marble) are protected in this way for example).

One common method for producing laminated glass involves filling a prepared glass-plate composite, which is sealed in the edge region, with a liquid casting resin that is cured under suitable conditions (for example under ultra-violet light, thermally or by means of redox-initiators). Casting resins that do not need to be cured and which have sufficient stability on account of their thixotropic properties, for example, can also be used for the production of laminated glass.

The cured casting resin can be transparent, coloured or turbid or can become turbid as a function of the temperature, and can contain, for example, silicone, polyurethane, polyester, polyether or polyacrylate as the main constituent.

The edge seals that are usually used for the production of laminated glass by means of casting technology are designed as butyl cords and adhesive tapes with thicknesses between 1 and 3 mm. Butyl cords, which can contain a hard core that is made from a thermoplastic polymer (for example polypropylene), consist, for example, of soft mixtures based on isobutylene-polymers and carbon black. Either foam tapes that are coated on both sides with contact adhesive and which are based on polyacrylate (ex 3M), polyethylene (ex Norton and Vito) or polyurethane (ex Norton) or else self-adhesive transparent solid tapes, consisting of polyacrylate (ex 3M), can be used as the adhesive tapes. Butyl cords and adhesive tapes are usually laid at the edge region of a glass plate by hand, the second plate is then laid on top, and the composite is finally pressed in a surface press until there is contact. The liquid casting resin is poured in through a piece that is left free in the edge seal (feed opening) and this resin can then be cured after the feed opening has been sealed by means of a further material (for example hot-melt adhesive based on ethylene vinyl acetate copolymer (EVA)).

The disadvantage, in this connection, is the manual application of the edge seal, and, moreover, problems of compatibility can arise between the casting resin and the sealing material for the feed opening. The process of sealing the edge by means of a butyl cord is, to a great extent, prone to allow a run-out during the filling and curing process, since the casting resins can easily infiltrate the boundary layer between the glass and butyl. In addition, the black colour of the butyl is perceived to be unpleasant. Furthermore, butyl cords, on account of the hard core, and adhesive tapes, in view of the high level of elasticity, have the disadvantage that they do not reduce the tensions which develop at the edge region of the layer of casting resin during the curing as a result of the contraction through polymerization, since it is only by plastically deforming the edge seal that tensions can be permanently reduced.

An improved edge seal is possible with the so-called "TPS-system", in which a strand of a material that can be processed thermoplastically, and which is based on isobutylene-polymers and carbon black, is automatically extruded onto a first glass plate by means of a suitable machine with variable strand thickness, the second glass plate is laid on top and then, by means of a surface press, this is pressed until there is a predetermined interspace. As described above, a casting resin is poured in through a feed opening, the feed opening is sealed by means of a hot-melt adhesive, and the casting resin is cured. It is disadvantageous in this connection, that the material that is used for the edge seal is too firm to reduce tensions at the edge region of the layer of casting resin completely. In addition, the black colour of the edge is strikingly unpleasant, since as a rule casting resin is transparent or translucent. Moreover, problems of compatibility with the hot-melt adhesive can also arise in the case of this laminated glass.

SUMMARY OF THE INVENTION

The underlying object of the invention is therefore to overcome the disadvantages of the prior art and develop a new hot-melt adhesive for sealing the edge of laminated glass produced by means of casting-resin technology and also to provide a method for the preparation of the new hot-melt adhesive.

The object is achieved by means of a hot-melt adhesive which consists of homopolymers or copolymers of acrylates or methacrylates, or mixtures thereof or which contains homopolymers or copolymers of acrylates or methacrylates, or mixtures thereof.

DETAILED DESCRIPTION OF THE PREFERRED EMBODIMENTS

The hot-melt adhesive in accordance with the invention consists of homopolymers or copolymers of acrylates or methacrylates, or mixtures thereof. The homopolymers or copolymers of acrylates or methacrylates, which are also called poly(meth)acrylates, are, as a rule, polymers of the esters of acrylic acid or methacrylic acid and can contain as alcohol constituents an alkyl group, substituted or unsubstituted by functional groups, for example methyl, ethyl, propyl, isopropyl, n-butyl, isobutyl, tert-butyl, pentyl and hexyl and their isomers and higher homologues, 2-ethyl hexyl, phenoxy ethyl, hydroxyethyl, 2-hydroxypropyl, caprolactone hydroxyethyl or dimethylaminoethyl. The homopolymers and copolymers of acrylates or methacrylates can also contain the monomers acrylic acid, methacrylic acid, the amides of the acids mentioned and acrylonitrile, and also in small quantities (<5%) further monomers, such as olefins (for example ethylene or propylene) or functional vinyl compounds (for example vinyl acetate, styrene, α-methyl styrene or vinyl chloride). It is also possible to use partly cross-linked poly(meth) acrylates, in which the cross-linkage is effected by way of a multi-function monomer with, for example, diethylene glycol or trimethylol propane as the alcohol constituents, and mixtures of the homopolymers and copolymers of acrylates or methacrylates.

The hot-melt adhesive in accordance with the invention according to claim 1 consists of homopolymers or copolymers of acrylates or methacrylates, or mixtures thereof. The homopolymers or copolymers of acrylates or methacrylates, which are also called poly(meth)acrylates, are, as a rule, polymers of the esters of acrylic acid or methacrylic acid and can contain as alcohol constituents an alkyl group, substituted or unsubstituted by functional groups, for example methyl, ethyl, propyl, isopropyl, n-butyl, isobutyl, tert-butyl, pentyl and hexyl and their isomers and higher homologues, 2-ethyl hexyl, phenoxy ethyl, hydroxyethyl, 2-hydroxypropyl, caprolactone hydroxyethyl or dimethylaminoethyl. The homopolymers and copolymers of acrylates or methacrylates can also contain the monomers acrylic acid, methacrylic acid, the amides of the acids mentioned and acrylonitrile, and also in small quantities (<5%) further monomers, such as olefins (for example ethylene or propylene) or functional vinyl compounds (for example vinyl acetate, styrene, α-methyl styrene or vinyl chloride). It is also possible to use partly cross-linked poly(meth) acrylates, in which the cross-linkage is effected by way of a multi-function monomer with, for example, diethylene glycol or trimethylol propane as the alcohol constituents, and mixtures of the homopolymers and copolymers of acrylates or methacrylates.

The hot-melt adhesive can additionally contain further components, such as thermoplastic polymers, natural and synthetic rubbers, tackifying additives, softeners, adhesion promoters, stabilizers and strengthening and non-strengthening fillers.

Examples of thermoplastic polymers are polyolefins as homopolymers and copolymers, built up out of the monomers ethylene, propylene, n-butene and their higher homologues and isomers, and of functional vinyl compounds, such as vinyl acetate, vinyl chloride, styrene and α-methyl styrene. Further examples are polyamides, polymides, polyacetals, polycarbonates, polyesters and polyurethanes and mixtures of all the polymers mentioned. The hot-melt adhesive in accordance with the invention can, however, also be prepared without thermoplastic polymers.

Natural and synthetic rubbers can be selected from the group of the homopolymers of dienes, the group of the copolymers and terpolymers of dienes with olefins, and the group of the copolymers of olefins. Examples are polybutadiene, polyisoprene, polychloroprene, styrene-butadiene rubber, block copolymers with blocks of styrene and butadiene or isoprene, butyl rubber, high-molecular polyisobutylene, ethylene vinyl-acetate rubber (EVM), ethylene propylene rubber and ethylene propylene diene rubber (EPDM), for example with dicyclopentadiene or ethyldiene norbornene as the diene constituent. The rubbers can also be used in a hydrogenated form and also in mixtures. The hot-melt adhesive in accordance with the invention can, however, also be prepared without rubber materials.

Tackifying additives can be selected from the group of natural and synthetic resins and also subsequently modified resins, which include inter alia hydrocarbon resins, colophonium and its derivatives, polyterpenes and their derivatives, coumarone-indene resins and phenolic resins, and from the group of polybutenes, polyisobutenes and broken-down liquid rubbers (for example butyl rubber or EPDM) which can also be hydrogenated. Mixtures of the tackifying additives listed can also be used. The hot-melt adhesive in accordance with the invention can, however, also be prepared without tackifying additives.

Examples of plasticisers are esters of phthalic acid (for example di-2-ethyl hexyl-phthalate, diisodecyl-phthalate, diisobutyl-phthalate or dicyclohexyl-phthalate), phosphoric acid (for example 2-ethyl hexyl-diphenyl-phosphate, tri-(2-ethyl hexyl)-phosphate or tricresyl phosphate), trimellitic acid (for example tri-(2-ethyl hexyl)-trimellitate or tri-isononyl-trimellitate), citric acid (for example acetyl tributyl citrate or acetyl triethyl citrate) or dicarboxylic acids (for example di-2-ethyl hexyl-adipate or dibutyl sebacate). Mixtures of the plasticisers can also be used. The hot-melt adhesive in accordance with the invention can, however, also be prepared without plasticisers.

Adhesion-promoting substances can be selected from the group of silanes, which can include, for example, 3-glycidyl oxypropyl-trialkoxysilane, 3-amino propyl-trialkoxysilane, N-aminoethyl-3-amino propyl-trialkoxysilane, 3-methacryloxypropyl-trialkoxysilane, vinyl-trialkoxysilane, isobutyl-trialkoxysilane, 3-mercaptopropyl-trialkoxysilane, from the group of silicic acid esters, for example tetralkyl orthosilicates, and from the group of metallates, for example tetralkyl titanates or tetralkyl zirconates, and also mixtures of the adhesion-promoting substances listed. The hot-melt adhesive in accordance with the invention can, however, also be prepared without adhesion-promoting substances.

Stabilizers can be antioxidants of the sterically hindered phenol type (for example tetrakis[methylene-3-(3,5-di-tert-butyl-4-hydroxyphenyl)propionate]methane) or of the sulphur-based antioxidant type, such as mercaptans, sulphides, polysulphides, thiourea, mercaptals, thioaldehydes, thioketones. UV-protection means of the benzotriazole type, the benzophenone type or the HALS (Hindered Amine Light Stabilizer) type and also ozone-protection agents can also be used as stabilizers. They can be used either alone or in mixtures. The hot-melt adhesive in accordance with the invention can, however, also be prepared without stabilizers.

Examples of reinforcing and nonreinforcing fillers are pyrogenic and precipitated silicic acid respectively, silica gel, precipitated or ground chalk (also surface-treated), calcium oxide, clay, kaolin, talc, quartz, zeolites, titanium dioxide, glass fibres or aluminium and zinc powder and mixtures thereof. Unless a dark colour of the hot-melt adhesive in accordance with the invention is perceived to be inconvenient, it is also possible to use carbon black, carbon fibres or graphite. The hot-melt adhesive in accordance with the invention can, however, also be prepared without fillers.

If the hot-melt adhesive in accordance with the invention consists of a plurality of components, it is prepared by mixing the homopolymers and/or copolymers of acrylates and/or methacrylates with the further components in a suitable mixing unit. If high shearing forces are required, the mixing unit can, for example, be a kneader, a double-screw extruder or a single-screw extruder. If high shearing forces are not required, mixing can be effected by means of a planetary dissolver, a blade mixer with a dissolver disc, a turbulence mixer or similar units. Whether high or low shearing forces are required depends upon the consistency of the starting materials and the respective product; high shearing forces are required thus in order to incorporate rubbers or reinforcing fillers.

The mixing temperature lies in the range of 40° C. to 200° C., preferably in the range between 70° C. and 180° C. Optionally, mixing can also be effected in a protective gas or under vacuum.

The hot-melt adhesive in accordance with the invention can be used to produce laminated glass that is produced by means of casting-resin technology, with the method including the following steps for the production of the laminated glass:

- applying the hot-melt adhesive in accordance with the invention to the edge region of a glass pane by means of suitable apparatus (for example an extruder or a barrel pump);
- laying a second glass pane so as to be congruent therewith on the hot-melt adhesive;
- pressing the laminated glass to a predetermined thickness;
- filling the interspace between the panes with a casting resin;
- as a rule, sealing the feed opening with a suitable material, for example the hot-melt adhesive in accordance with the invention;
- as a rule, curing the casting resin under suitable conditions (for example by UV-radiation treatment, thermally or by means of redox-initiators);
- optionally, repeating the method steps in the case of laminated glass that has more than two glass panes.

The hot-melt adhesive in accordance with the invention is processed in the usual equipment for the application of hot-melt adhesive or by means of an extruder, with the processing temperature typically lying in the range between 40° C. and 200° C., preferably between 70° C. and 180° C.

Advantageously, it is possible to fill the interspace between the panes with a casting resin by means of a feed opening which must then be subsequently sealed by means of a suitable material (advantageously by means of the hot-melt adhesive in accordance with the invention, but also, for example, by means of another hot-melt adhesive which is usually used). Other filling methods operate by means of one or more needles (for example a comb of needles) which are guided through the edge seal, with then at least one further needle advantageously being inserted through the edge seal for the purposes of improved ventilation. If thin needles are used for filling purposes, the openings through the edge seal can seal themselves on their own or can be sealed by manual deformation of the edge seal.

The hot-melt adhesive in accordance with the invention has the following functions in laminated glass:

- as a seal for the interspace between the panes of the laminated glass, in the case of casting-resin systems that are to be cured during the process of filling with casting resin and the subsequent curing, or in the case of casting-resin systems that do not need to be cured during and after the process of filling with casting resin;
- as spacers for the interspace between the panes of the laminated glass with a high plastic content in order to reduce tensions which develop during curing at the edge region of the layer of casting resin.

If the hot-melt adhesive also contains fillers which are simultaneously used as drying agents (such as, for example, zeolites, silica gel or calcium oxide), the hot-melt adhesive also acts as a barrier to water vapour which can reach the layer of casting resin from outside through the edge seal.

It is also possible to produce laminated glass that has more than two glass panes by means of the hot-melt adhesive in accordance with the invention.

Laminated glass produced by means of the hot-melt adhesive in accordance with the invention can be used for safety glass, sound-proofing glass and fire-protection glass.

If the hot-melt adhesive in accordance with the invention is used to produce a laminated glass, one glass pane of which is a thin-film solar module, a composite photovoltaic module is obtained.

It is possible to seal the edge of the panes with the aid of the hot-melt adhesive in accordance with the invention before objects are cast in the interspace between the panes of the glass-pane composite. The hot-melt adhesive in accordance with the invention can also be used, in the case of this application, to fix the objects, which are to be cast in the interspace between the panes, in said interspace before filling with casting resin. Objects which are to be cast therein can, for example, be lamellar systems or solar cells.

A further use of the adhesive in accordance with the invention is one where when a composite is produced in which, by means of the adhesive, a glass pane is adhered with a certain clearance on a surface that is to be protected, the edge is sealed, and subsequently, the space between the surface that is to be protected and the glass pane is filled in with a casting resin.

Furthermore, the hot-melt adhesive in accordance with the invention can advantageously be used as a sealing material for feed openings for casting resin after the interspace between the panes has been filled with casting resin.

The hot-melt adhesive in accordance with the invention as an edge seal for laminated glass produced by means of casting-resin technology has the advantage, in comparison with the known edge seals, that on account of its high plastic content it contributes to the reduction in tensions at the edge region of the layer of casting resin that can develop as a result of the contraction through polymerization during the curing process, and thus the risk of damage, as a result of the layer of casting resin becoming detached from the glass or, as a result of cracks in the layer of casting resin, is diminished. A further great advantage lies in the increased security that the edge seal provides against casting resin running out during the filling and curing process in comparison with the known edge seals. Moreover, the hot-melt adhesive in accordance with the invention makes it possible to automate the application of the edge seal.

Various embodiments of the hot-melt adhesive that is claimed are described in greater detail in the following examples. All the percentages given, unless otherwise specified, are weight percentages.

EXAMPLES 1 AND 2

Synthesis of Poly(meth)acrylates by Means of UV-polymerization

The synthesis of precursors of the hot-melt adhesive in accordance with the invention is described in Examples 1 and 2.

EXAMPLE 1

0.8 g (0.4% a relative to monomers) of benzyl dimethyl ketal were added to 200 g of a mixture consisting of 2-ethyl hexyl acrylate, 2-ethyl hexyl methacrylate and acrylic acid (weight ratio 65:33:2). The mixture was placed in a composite, which consisted of a Teflon pane and a polyester foil with a non-stick coating (Hostaphan ex Hoechst) and which was sealed by means of an adhesive tape that was 2 mm thick and coated on both sides with contact adhesive, and was polymerized by UV-radiation treatment (tube type: Philips TL 36 W/08) for 20 minutes.

EXAMPLE 2

200 g of a mixture of methyl methacrylate, 2-ethyl hexyl acrylate, n-butyl acrylate, 2-ethyl hexyl methacrylate and acrylic acid (weight ratio 30:25:20:11:40) were polymerized, analogously to Example 1, with 2 g (1% relative to monomers) of benzyl dimethyl ketal under the influence of UV light for 30 minutes.

EXAMPLES 3 TO 5

Mixing the Hot-melt Adhesive

EXAMPLE 3

In a kneader heated to 130° C., 80 g (66.7%) of the copolymer from Example 1 were kneaded with 40 g (33.3%) of an acrylate resin (Jägotex AP 273 ex Jäger) for 60 minutes. A vacuum was then applied for 30 minutes at 130° C. and subsequently, the material was poured into a cartridge. This hot-melt adhesive contains no further components.

EXAMPLE 4

60 g (69.0%) of the copolymer from Example 1 were kneaded with 6 g (6.9%) of highly dispersed silicic acid, 20 g (23.0%) of an acrylate resin (Jägotex AP 273 ex Jäger) and 1 g (1.1% tetrakis[methylene-3-(3,5-di-tert-butyl-4-hydroxyphenyl)propionate]methane) (Ralox 630 ex Raschig, stabilizer) for 60 minutes in a kneader heated to 130° C. A vacuum was then applied for 30 minutes at 130° C. and subsequently the material was poured into a cartridge.

EXAMPLE 5

120 g (85.7%) of the copolymer from Example 2 were kneaded with 12 g (8.6%) acetyl tributyl citrate (plasticiser), 1 g (0.7%) tetrakis[methylene-3-(3,5-di-tert-butyl-4-hydroxyphenyl)propionate]methane) (Ralox 630 ex Raschig, stabilizer) and 7 g (5.0%) highly dispersed silicic acid for 60 minutes in a kneader heated to 130° C. A vacuum was then applied for 30 minutes at 130° C. and subsequently the material was poured into a cartridge.

EXAMPLE 6

Use of the Hot-melt Adhesive

Strands of the hot-melt adhesive from Examples 3 to 5 were applied from a cartridge at 150° C. to the edge region of a glass pane, having dimensions of 30 cm×30 cm×4 mm, by means of a heatable blow gun having a nozzle diameter of 4 mm, a second glass pane having the same dimensions as the first was laid on top so as to be flush therewith and this was pressed to give an interspace between the panes of 2 mm. Immediately afterwards, an acrylate-based casting resin (Naftolan® UV 22 ex Chemetall) was poured in through a feed opening left free in the edge seal by way of a feed hose, and the opening was sealed by means of a hot-melt adhesive. The filled panes were cured by UV-radiation treatment (tube type: Philips TL 36 W/08) within 15 minutes.

EXAMPLE 7

Run-out Times of Non-cured Casting Resin in Glass-pane Composites Which Contain the Hot-melt Adhesive in Accordance With the Invention In order to demonstrate the advantage of the higher level of security against run-out that is achieved when the hot-melt adhesive in accordance with the invention is used, in comparison with edge seals which were used previously, the run-out times of a non-cured casting resin were determined on upright glass-pane composites having different edge seals in each case. The run-out time is the time during which the edge seal is infiltrated by the casting resin and the casting resin starts to run out. The results are shown in Table 1.

COMPARATIVE EXAMPLE A

Use of a Butyl Cord as an Edge Seal

A commercially available butyl cord having a core which has a diameter of 3.5 mm (Naftotherm® BU-cord 4554 ex Chemetall) was applied to the edge region of a glass pane analogously to Example 6, a second glass pane was laid on top so as to be flush therewith and this was pressed to give an interspace between the panes of 2 mm. Immediately afterwards, an acrylate-based casting resin was poured in and, analogously to Example 7, the run-out time of the non-cured casting resin was determined. The result is shown in Table 1.

COMPARATIVE EXAMPLE B

Use of a Self-adhesive, Solid Polyacrylate-based Adhesive Tape as an Edge Seal

A commercially available self-adhesive, solid polyacrylate-based adhesive tape (Acrylic foam tape® 4918 ex 3M) having a thickness of 2 mm was applied to the edge region of a glass pane analogously to Example 6, a second glass pane was laid on top so as to be flush therewith and this was pressed onto the adhesive tape. Immediately afterwards, an acrylate-based casting resin was poured in and, analogously to Example 7, the run-out time of the non-cured casting resin was determined. The result is shown in Table 1.

COMPARATIVE EXAMPLE C

Use of a Polyacrylate-based Foam Tape, Which is Coated on Both Sides With a Contact Adhesive, as an Edge Seal A commercially available polyacrylate-based foam tape coated on both sides with a contact adhesive (Acrylic foam tape® 4912 ex 3M) and having a thickness of 2 mm was applied to the edge region of a glass pane analogously to Example 6, a second glass pane was laid on top so as to be flush therewith and this was pressed onto the adhesive tape. Immediately afterwards, an acrylate-based casting resin was poured in and, analogously to Example 7, the run-out time of the non-cured casting resin was determined. The result is shown in Table 1.

Table 1: (Run-out times of glass-pane composites with different edge seals after filling with acrylate-based casting resin and without curing the casting resin)

| Edge seal according to | Run-out time/min |
| --- | --- |
| Example 3 | 50 |
| Example 4 | >60 |
| Example 5 | >60 |
| Comparative Example A | 1–2 |

-continued

| Edge seal according to | Run-out time/min |
|---|---|
| Comparative Example B | 7–10 |
| Comparative Example C | 15–20 |

It is seen that the run-out times of the Comparative Examples A to C clearly lie below the run-out times of Examples 3 to 5. This shows that with pane composites produced with the hot-melt adhesive in accordance with the invention a comparatively high level of production-security is achieved, since infiltration of the edge seal by the casting resin and resultant leakages need not be feared.

What is claimed is:

1. A laminated glass, comprising first and second glass panes, an intermediate layer connecting the first and second glass panes, and a hot-melt adhesive applied only to an edge region between the first and second glass panes, wherein the hot-melt adhesive comprises homopolymers or copolymers of acrylates or methacrylates or mixtures of the polymers.

2. The laminated glass according to claim 1, wherein the intermediate layer comprises a cured casting resin and the laminated glass is used for safety, sound-proofing and fire-protection purposes, for the production of photovoltaic modules or for the production of laminated glass with objects cast in the interspace.

3. A laminated glass, comprising first and second glass panes, an intermediate layer connecting the first and second glass panes, and a hot-melt adhesive applied to an edge region between the first and second glass panes, wherein the hot-melt adhesive comprises homopolymers or copolymers of acrylates or methacrylates or mixtures of the polymers, wherein the laminated glass is produced by a process in which the hot-melt adhesive is applied to the edge region of the first glass pane, the second glass pane is then laid thereon so as to be congruent therewith to form a glass pane composite, the glass-pane composite is then pressed to the predetermined thickness, an interspace between the panes is then filled with a casting resin, a feed opening is then sealed, and finally the casting resin is cured.

4. The laminated glass according to claim 3, wherein the hot-melt adhesive is used as a sealing material for the feed opening for the casting resin.

5. The laminated glass according to claim 1, wherein the hot-melt adhesive comprises the following composition (specified in percent by weight):

homopolymers or copolymers of acrylates or methacrylates or mixtures of

| polymers | 30–100% |
|---|---|
| thermoplastic polymers | 0–50% |
| natural and synthetic rubbers | 0–50% |
| tackifying additives | 0–30% |
| plasticisers | 0–50% |
| adhesion promoters | 0–5% |
| stabilizers | 0–5% |
| reinforcing and non-reinforcing fillers | 0–50%. |

6. The laminated glass according to claim 1, wherein the hot-melt adhesive comprises the following composition (specified in percent by weight):

homopolymers or copolymers of acrylates or methacrylates or mixtures of the

| polymers | 50–100% |
|---|---|
| thermoplastic polymers | 0–30% |
| natural and synthetic rubbers | 0–30% |
| tackifying additives | 0–25% |
| plasticisers | 0–30% |
| adhesion promoters | 0–2% |
| stabilizers | 0–2% |
| reinforcing and non-reinforcing fillers | 0–30%. |

7. A method for making laminated glass comprising:
providing a first glass pane;
applying a hot melt-adhesive to an edge region of the first glass pane wherein the hot-melt adhesive comprises homopolymers or copolymers of acrylates or methacrylates or mixtures of the polymers;
laying a second glass pane on the first glass pane so as to be congruent with the first glass pane to form a glass pane composite;
pressing the glass pane composite to a predetermined thickness;
filling an interspace between the first and second glass panes with a casting resin through at least one feed opening;
sealing the at least one feed opening; and
curing the casting resin.

8. The method according to claim 7, wherein the hot-melt adhesive comprises the following composition (specified in percent by weight):

homopolymers or copolymers of acrylates or methacrylates or mixtures of

| polymers | 30–100% |
|---|---|
| thermoplastic polymers | 0–50% |
| natural and synthetic rubbers | 0–50% |
| tackifying additives | 0–30% |
| plasticisers | 0–50% |
| adhesion promoters | 0–5% |
| stabilizers | 0–5% |
| reinforcing and non-reinforcing fillers | 0–50%. |

9. The method according to claim 7, wherein the hot-melt adhesive comprises the following composition (specified in percent by weight):

homopolymers or copolymers of acrylates or methacrylates or mixtures of the

| polymers | 50–100% |
|---|---|
| thermoplastic polymers | 0–30% |
| natural and synthetic rubbers | 0–30% |
| tackifying additives | 0–25% |
| plasticisers | 0–30% |
| adhesion promoters | 0–2% |
| stabilizers | 0–2% |
| reinforcing and non-reinforcing fillers | 0–30%. |

10. The method according to claim 7, further comprising sealing the at least one feed opening with the hot-melt adhesive.

11. The laminated glass according to claim 1, wherein the intermediate layer comprises a cured casting resin.

12. The laminated glass according to claim 1, wherein the intermediate layer comprises a resin having a composition different than the hot-melt adhesive.

* * * * *